(12) United States Patent
Green et al.

(10) Patent No.: US 9,135,433 B2
(45) Date of Patent: Sep. 15, 2015

(54) IDENTIFYING REPUTATION AND TRUST INFORMATION FOR SOFTWARE

(75) Inventors: Mitch Green, Boulder, CO (US); Kevin Lynch, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1949 days.

(21) Appl. No.: 12/201,326

(22) Filed: Aug. 29, 2008

(65) Prior Publication Data

US 2010/0058468 A1 Mar. 4, 2010

(51) Int. Cl.
*G06F 7/04* (2006.01)
*G06F 17/30* (2006.01)
*H04N 7/16* (2011.01)
*G06F 21/51* (2013.01)

(52) U.S. Cl.
CPC ...................................... *G06F 21/51* (2013.01)

(58) Field of Classification Search
CPC ........................................................ G06F 21/51
USPC ............................... 713/156; 726/24; 717/174
See application file for complete search history.

(56) References Cited

U.S. PATENT DOCUMENTS

| 2007/0088741 A1* | 4/2007 | Brooks et al. .............. 707/103 R |
| 2008/0028390 A1* | 1/2008 | Fors et al. ...................... 717/174 |
| 2010/0005291 A1* | 1/2010 | Hulten et al. ................. 713/156 |

OTHER PUBLICATIONS

CyberTechHelp Support Forums, Apr. 2, 2007, Cyber Tech Help.*
Tactical Gamertechnical support & FAQs, Jul. 21, 2001, Tactical Gamer.*

* cited by examiner

*Primary Examiner* — Arvin Eskandarnia
(74) *Attorney, Agent, or Firm* — Shook, Hardy & Bacon L.L.P.

(57) ABSTRACT

Methods, systems, and computer program products identify trust and reputation information for an application. Status information including installation information and/or rating information corresponding to a software application is stored in a service or in a local computer cache. A software application is identified as corresponding to the status information, and the installation information and/or rating information is presented to a user prior to installation, launch, and/or update of the software application. Using the status information the user can make an informed decision on whether the user will trust the software application to permit the installation, launch, and/or update to occur.

30 Claims, 6 Drawing Sheets

IDENTIFYING REPUTATION AND TRUST INFORMATION FOR SOFTWARE

BACKGROUND

The present disclosure relates to identifying reputation and/or trust information for software run in a computing system, such as software applications that run in a cross-platform runtime environment of a computing platform.

Many approaches to managing software that is run in computing systems have been developed, and in particular, various approaches have been taken to help prevent malicious software from being installed or run on a computer. For example, WINDOWS® based computer platforms often enable the use of certificates to sign software applications to be installed on the computer. Such certificates can be checked at install time, and various notifications regarding the software application can be provided to the user, based on the certificate, at the time of installation, to help the user in determining whether or not to proceed with the installation. In addition, such certificates can be revoked.

Furthermore, when a software program (such as a plug-in to a Web browser) is downloaded from the Internet, the software program is typically signed by a certificate. In such a case, the Web browser provides information from the digital certificate (e.g., the name of the of application and the identity of the entity that signed the application using the certificate) along with a notice regarding the risks of trusting the information and the program, in order to help the user in safe guarding their computer from potentially malicious programs. For example, if the digital certificate is a self-signed certificate, the Web browser will notify the user of the increased risk of installing such software, as opposed to software that has been signed by a certificate that is co-signed by a recognized certificate authority.

Moreover, various commercially available software products provide anti-spyware and anti-virus features designed to maintain computer security. These software products typically scan files (e.g., executable files) for know bit patterns to identify viruses, Trojan horses, worms, etc. The scanning is typically performed periodically for software and data stored on a computer, and for network communications at the time of sending or receiving. Such programs can also be set up to automatically scan software at the point of installation. Moreover, such programs have also included functionality to verify trusted Web sites and block fake Web sites.

Checking for fake Web sites has also been implemented in at least one Web browser. Internet Explorer (provided by Microsoft Corporation of Redmond, Wash.) includes an option to turn on a phishing filter service. When a user opts-in to this service, every time the user clicks on a link to a Web page, the browser, in parallel with requesting the resources at the link, sends the URL (Uniform Resource Locator) to a phishing filter Web site where a list of malicious URLs is maintained. If the selected URL appears on this list, a message is sent back to the browser, and an appropriate action is taken by the browser, such as warning the user and asking for confirmation to proceed to the URL, or outright blocking of that URL.

SUMMARY

This specification describes technologies relating to providing reputation and/or trust information for software run in a computing system, such as software applications that run in a cross-platform runtime environment of a computing platform.

In general, one aspect of the subject matter described in this specification can be embodied in a method that includes receiving, at a computer from a reputation and trust service, status information corresponding to a software application, the status information comprising rating information or installation information. The method also includes updating a local cache, retained by the computer, with the status information received from the reputation and trust service, and generating an identifier for a software application, using a digital certificate and a hash value. The method further includes checking the identifier for the software application against the status information, and notifying when a match is found during the checking.

According to some features, the installation information is a number of prior installations of the software application, and the rating information is an average rating of the application based on a plurality of user ratings. According to other features, the status information comprises installation information, and notifying includes presenting a warning user interface indicating the number of prior installations or the average rating of the software application.

The method can also include requesting instructions whether to proceed with the installation of the software application. Additionally, according to a feature, receiving the status information, updating the local cache, generating the identifier, checking the identifier, and notifying the user are each performed by a cross-platform runtime environment in which the software application runs.

Generating the identifier for the software application can also include generating an identifier corresponding to a software component of the software application when the software application is updated on the computer by addition of the software component. Furthermore, checking the identifier can include checking the identifier for the software application against the status information in the local cache retained by the computer and/or against new status information obtained from the reputation and trust service.

Another aspect of the subject matter described in this specification can be embodied in a method that includes receiving a request to install an application, and in response to the request, generating an identifier for the application. The identifier is used to identify status information received from a service, the status information including installation information or rating information for the application. The method further includes presenting a notification when the status information is identified.

Yet another aspect of the subject matter described in this specification can be embodied in a method that includes storing, at a server, status information including rating information or installation information for one or more software applications, receiving, at the server, a request from a client, where the request identifies a first application and is initiated at the client in response to an attempt to install the first application, and sending the client status information corresponding to the first application.

Other embodiments of the above aspects include corresponding systems, apparatus, and computer program products.

Particular embodiments of the subject matter described in this specification can be implemented to realize one or more of the following advantages. Every application to be run on a computer platform (e.g., in an application execution environment on a computing system) can be signed by a certificate and have a unique identifier that is derived from the certificate and a hash value obtained by running a hashing algorithm over data from the application, which data can include both the code of the application and the digital certificate for the application.

The unique identifier for the application (or information from which the identifier can be derived) can be sent to a network-based service (e.g., a reputation and trust service) that returns status information about the application. For instance, the status information can include installation information, such as the number of times an application has been installed by users, or the number of attempts to install an application. The status information can also include rating information provided by users or other evaluators. Thus, a network-based service can be provided whereby end users can be given timely information about whether other users have installed an application or have rated the application as safe or useful and, which in turn may encourage or discourage a user to install the application.

The unique identifier for the application can also or alternatively be checked against trust or rating information stored in a local cache (retained by the computer) in order to assist an end user in determining whether software should be installed and run. Use of a local cache that is updated using a network-based service allows protection to extend to offline situations while also facilitating up to the minute information regarding which software can be used safely.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A software application (which for brevity will simply be referred to as an application) is a computer program designed to add functionality to a general purpose computer. An application does not necessarily correspond to a file, may be stored in a portion of a file that holds other information, in a single file dedicated to the application in question, or in multiple coordinated files (which can be both local and remote). A software component of an application is a piece of software used with other software to build an application. A software component can include other components, does not necessarily correspond to a file, may be stored in a portion of a file that holds other information, in a single file dedicated to the software component in question, or in multiple coordinated files (which can be both local and remote).

Figure 1:
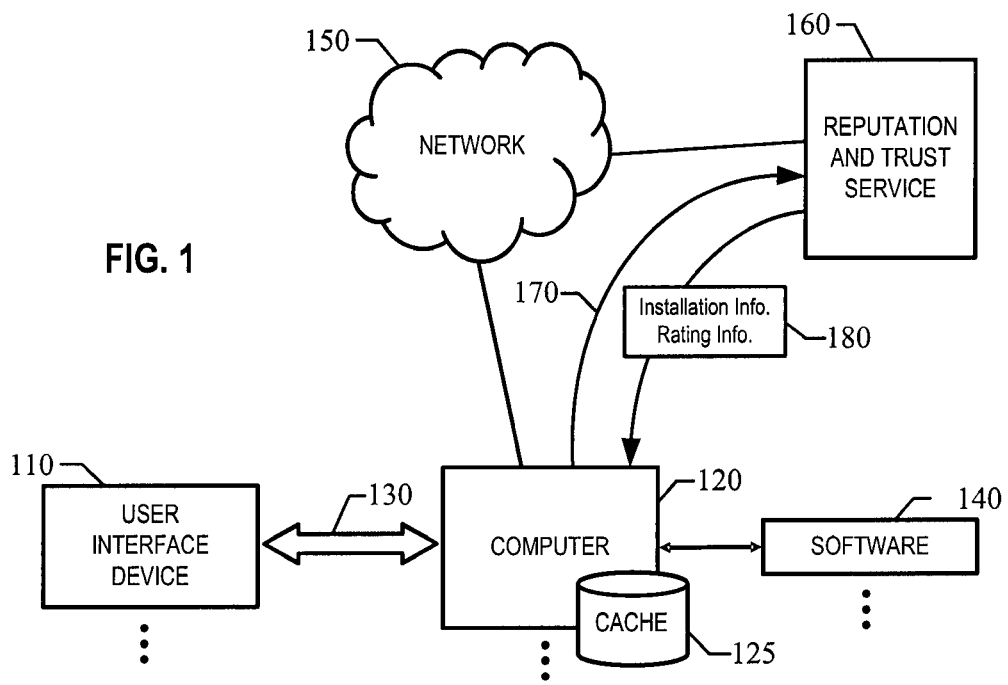
FIG. 1 shows an example system in which the software to be run on a computer is managed based on status information.

FIG. 1 shows an example system in which the software to be installed, launched, or updated on a computer is managed based on status information including installation information and/or rating information. One or more user interface devices (110) are communicatively coupled with one or more computers (120) through a channel (130). The channel (130) can include wired or wireless channels, one or more internal computing system busses, one or more computer networks, or combinations thereof. The user interface device(s) (110) can include input/output devices (e.g., a display, keyboard and mouse), and the computer(s) (120) can be separate from the user interface device(s) (110) (e.g., server computers accessible over a network) or integrated with the user interface device(s) (110) (e.g., a laptop computer having a computer and a user interface device included therein).

A computer (120) has associated software (140) that can be installed, run and updated. The software (140) can include both applications and software components thereof, which are identified in order to manage whether the software (140) will be allowed to run on the computer (120). The computer (120) can create identifiers for the software (140) using associated digital certificates and hash values. The individual software applications and components can be digitally signed with certificates using known techniques. A certificate used in digitally signing software can be associated with a publisher/developer of the software, can be specific to the software in question, or both.

Moreover, a digital certificate for the software in question can include multiple certificates, such as a chain of certificates created when the software was originally signed (e.g., by the software publisher). The digital certificate can be a self-signed certificate or a counter-signed certificate (e.g., signed by a Certificate Authority, such as VeriSign, Inc. of Mountain View, Calif.) that is part of an embedded certificate chain. Note that in many scenarios, an embedded certificate chain will be the typical situation. Creating the identifier for the software from a digital certificate can involve using a chain of certificates, and the identifier can be used in a computing system to manage installation, running and updating of the software, as described further below.

§1.0. The Reputation and Trust Service

The computer (120) can be connected to a reputation and trust service (160) through a network (150). Generally, the reputation and trust service (160) provides the a user associated with the computer (120) with information about the software (140) so that the user can make an informed decision on whether to install, execute, or update the software on the computer (120). The network (150) can include a public network (e.g., the Internet or the public switched telephone network), a private network (e.g., an enterprise network or a virtual private network), or both. The reputation and trust service (160) can include a single server computer or multiple server computers (e.g., a server cluster, a server farm, or distant server computers linked through a network).

The computer (120) sends one or more requests (170) to the reputation and trust service(160), and in response to the requests (170) the reputation and trust service (160) sends status information (180) back to the computer (120). Each request (170) can be explicit, such as a specific request for at least a portion of the status information (180), or the request (170) can be implicit, such as a request for a connection with the reputation and trust service (160) for other services. The status information can be used immediately by the computer (120) to determine whether or not to take action (e.g., installation, execution, or update) with respect to the software (140), and/or may be stored by the computer (120) in the cache (125) for future reference.

In some implementations requests (170) can be sent periodically (e.g., based upon rules that can be pre-configured within the software application or dynamically configured and adjusted within the software application by a server system), sent upon designated events (e.g., whenever the computer (120) reconnects to the network (150) after being offline for awhile, or whenever the computer (120) installs or updates software (140) using a connection over the network (150)), or a combination of these. Further, the times when requests (170) are sent can be limited based on network bandwidth, computing system processing resources, and other factors for the overall system.

As an example, a request (170) can be sent to the reputation and trust service (160) at the time of an installation, or attempted installation, of the software (140). The identifiers for the software (140) may be used to identify the software (140) to the reputation and trust service (160). In this manner a user can access and review the most recent status information from the reputation and trust service prior to making a decision to install the software (140) on the computer (120). In addition to transmission of a request (170) at installation, requests (170) may also be periodically sent from the computer (120) to the reputation and trust service (160) on a schedule bases, such as once a day, to collect updated status information from the service (160). The status information can be stored in a storage device, such as a cache (125) of the computer (120), and can be accessed by the computer (120) when previously installed software (140) is launched (i.e., run) or when a request is made to update the software (140).

§2.0. Status Information

The status information (180) can include two different types of information corresponding to software (140) that can be installed, run and updated on the computer (120): installation information and/or rating information. The installation information can identify the number of times that the software (140) has previously been installed on other computers, the number of attempted installs of the software (140), and/or other installation information such as the number of times the computer (120) has reinstalled the software (120) or has installed an updated version of the software (140).

According to some implementations, installation information is collected by the reputation and trust service (160) from each computer (120) at the time the software (140) is installed. For instance, a runtime at the computer (120) will communicate with the reputation and trust service (160) automatically at installation of software (140) to identify that the software has been installed, thereby enabling the reputation and trust service (160) to increment a stored installation counter associated with the software (140).

The rating information can include rating information, such as an average rating, provided to the software (140) by one or more other users or third party evaluators. One or more rating values can be included in the rating information. The rating could indicate general usefulness or satisfaction with the software or can be specifically tied to the trustworthiness or security of the software. For instance, a software application could have a '3.5 star' rating out of a possible high rating score of '5' for user satisfaction with the software.

Determinations of the rating information can be restricted to and performed by one or more administrators (i.e., operators) of the reputation and trust service (160), but such determinations can additionally or alternatively be based on input provided by third parties. For example, users may input rating information for the software (140) into an interface available on a web page, such as a white listing service (e.g., a Web-based service that allows user to rate software publishers/developers).

Once received, the status information (180) can be used to manage an immediate action taken with respect to the software (140), such as installation of the software (140). The status information can also or alternatively be provided to a local cache (125) retained by the computer (120) for storage and retrieval when online communications with the service are deemed to be too slow for a satisfactory user experience, when the service is unavailable, or when the user's computer isn't connected to the Internet. The local cache (125) can be implemented using hardware, firmware and software elements, and can employ encryption and anti-tampering techniques to maintain the security of the data therein.

§3.0. Computing Platform

Figure 2:
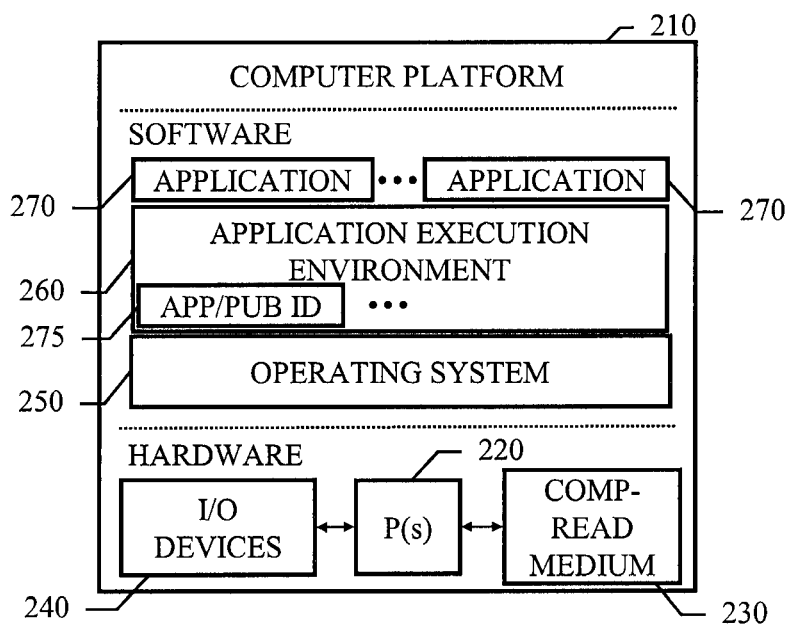
FIG. 2 shows an example computing system, including an application execution environment, in which software applications are identified.

A computer (120) can include any one of many different types of computer platforms, which can run different operating systems. In addition, a computer (120) can include a computing system that has additional software installed, on which the software (140) depends. FIG. 2 shows an example computing system, including an application execution environment, in which software applications are identified. A computer platform (210) includes both hardware and software. The hardware includes input/output devices (240), one or more processors (220) and at least one computer readable medium (230) (e.g., memory device(s), a storage device(s), or combinations of one or more of them). The software can include an operating system (OS) (250) on which the software elements of the computer platform (210) operate.

In addition, an application execution environment (260) can use the operating system (250) to interact with other elements of the computer platform (210). The application execution environment (260) can provide various utility services for use by applications that run in the application execution environment (260). These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provided using a runtime library. Moreover, the application execution environment (260) can include a cross-platform application program interface (API) that provides services to applications (270) that run in the application execution environment (260) and serves to abstract away details of the various hardware and OS platforms on which the application execution environment program (260) has been designed to operate.

The application execution environment (260) can be a cross-OS runtime environment, such as the Adobe® AIR™ runtime, provided by Adobe Systems Inc. of San Jose, Calif. In some implementations, the application execution environment (260) can load an application (270) from an encoded representation of the application (270). For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment (260) can decode the encoded representation of the application (270) into instructions and can execute the instructions of the application.

In addition, the application execution environment (260) can create software identifiers (275) for the applications (270) using the digital signatures associated therewith. These software identifiers (275) can include publisher/developer-specific identifiers and application-specific identifiers, and can be relatively long lived (e.g., 3-5 years, or more), allowing further feature development within the application execution environment (260) based on the software identifiers (275). For example, the software identifiers (275) can be used to facilitate inter-application communications, to provide application-specific secure storage in the computer platform (210), or to support a generic installer mechanism for applications to be installed on the application execution environment (260).

The software identifiers (275) can be used for other purposes as well, such as to identify an application that plays media content subject to digital rights management (DRM) requirements. Such an application can be confirmed as authentic and uniquely identified before media content or decryption key(s) are delivered to the application. Note that the software identifiers (275) should generally be consistent from one computing system to another, and the author or publisher of the applications (270) should have control over their respective software identifiers (275). In any case, the software identifiers (275) can be used to manage which applications (270) are allowed to be installed, run and updated in the computer platform (210).

Figure 3:
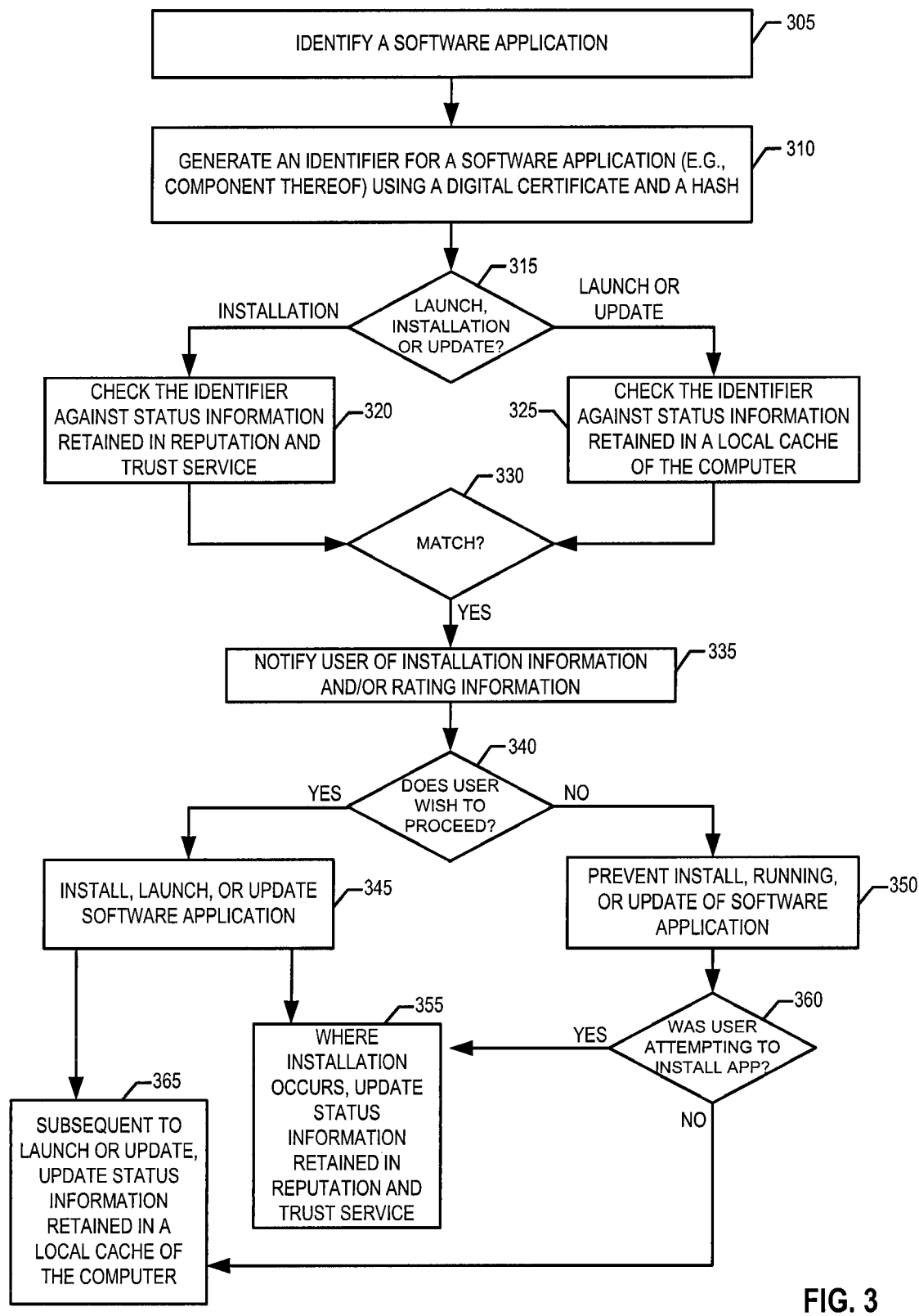
FIG. 3 shows an example process for using status information to inform a user about a software application to permit the user to make an informed decision regarding installation, execution, and update of the software.

§4.0. Permitting or Preventing Installation Launch, or Update of Software Using Status Information FIG. 3 shows an example process using status information (180) provided by the reputation and trust service (160) to inform a user as to the potential trustworthiness for software to be installed or run in a computing system. The process can begin when a software application is identified (305), for instance, by a computer (120).

Next, an identifier for the software application can be generated (310) using a digital certificate and a hash value. As noted above, the identifier for the software application can correspond to a software component included within the software application. The hash value can be obtained by running a hashing algorithm over one or more portions of the software application, including potentially just a portion of a digital certificate embedded in the software application. Other information can be used to create the identifier as well, such as a name of the software application or software component.

Moreover, one or more portions of the digital certificate can be used in creating the software identifier. For example, certificate owner names (e.g., certificate subjects, distinguished names, alternative names or Domain Name Service (DNS) entries) can be used in generating software identifiers. This can make the application identifies more robust, allowing them to survive changes to the digital certificates used with the software. Note that, typically, when a Certificate Authority reissues a certificate (e.g., in case of certificate expiry), the new certificate identifies the certificate owners (and thus the application author) the same way as before. For additional details regarding various techniques for creating a software identifier, see U.S. patent application Ser. No. 12/001,497, entitled "Application Identification", filed Dec. 11, 2007.

Next, a launch, installation, or update action that a user wishes to take with respect to the application is identified (315). Launching software means initiating the running of the software, such as by double clicking on an icon representing a software application in a graphic user interface of a computing system. Installing software means making changes to a computing system to allow the software to be run on the computing system in a specified manner, such as by running an installer program in which the software is embedded. Updating software means changing a component of the software, such as by adding or modifying a component of an already installed software application, or by adding or modifying a component to a software application being created (e.g., when an application execution environment used to run the software applications also provides functionality for creating new software applications from existing software components).

If the user wishes to install the application (315), the identifier can be checked (320) against status information in a local cache retained by the computing system. It will be appreciated that use of status information in the local cache can be advantageous to prevent timely communications with the reputation and trust service (160), for instance, at the time of launch of an application. The status information can include entries, where each entry includes a software identifier (e.g., a single value or a multi-value identifier), the installation information (including, for instance, number of installs of the software application by other users) and/or rating information (e.g., an average rating of the trustworthiness of the software application), and an optional information field (e.g., used to store text information regarding the software corresponding to the identifier). The status information can be stored as one or more files, relationals, binaries, etc., and can employ various data formats, such as XML (extensible Markup Language).

If the user wishes to launch or update the application (315), the identifier can be checked (325) against status information in a local cache retained by the computing system. The status information can include the same type of information as described in the preceding paragraph. Although FIG. 3 is illustrated as providing that the status information of the reputation and trust service (160) is checked when installation of an application is requested, and the status information stored in a cache on the user's computer is checked when launch or update of an application is requested, in some implementations the status information will only be checked at one source. For instance, the status information retained in the reputation and trust service (160) can be checked at launch, installation, or update of the application.

If the generated identifier matches (330) an identifier in the reputation and trust service or cache, a user of the computing system is provided with the installation information and/or rating information (335). This can include, for instance, displaying the installation information and/or rating information to the user via one or more graphical user interfaces (GUIs) prior to the launch, installation, or update of the software (140).

The user can be asked for instructions, for instance, via a GUI, whether the user wishes to proceed with the launch, installation, or update of the software (340). Thus, the installation information and/or rating information can be utilized by the user as a measure of the likely trustworthiness of the software application.

If the user wishes to proceed, the installation, launch, or update of the software application occurs (345). The status information stored in the reputation and trust service is updated if installation occurs (355). For instance, the number of installations in the status information of reputation and trust service corresponding to the installed software application can be incremented. Additionally, the status information retained in the local cache may be updated immediately after the launch or update, or on a scheduled basis as previously detailed (365).

If the user does not wish to proceed with installation, launch, or update (340), the computer will prevent those actions from occurring (350). The status information stored in the reputation and trust service can be updated if installation was attempted (360, 355). For instance, the number of attempted installations in the status information of reputation and trust service corresponding to the software application can be incremented. Additionally, the status information retained in the local cache may be updated immediately after the denial of the launch or update, or on a scheduled basis as previously detailed (365).

§5.0. Example Graphical User Interface

Figure 4A:
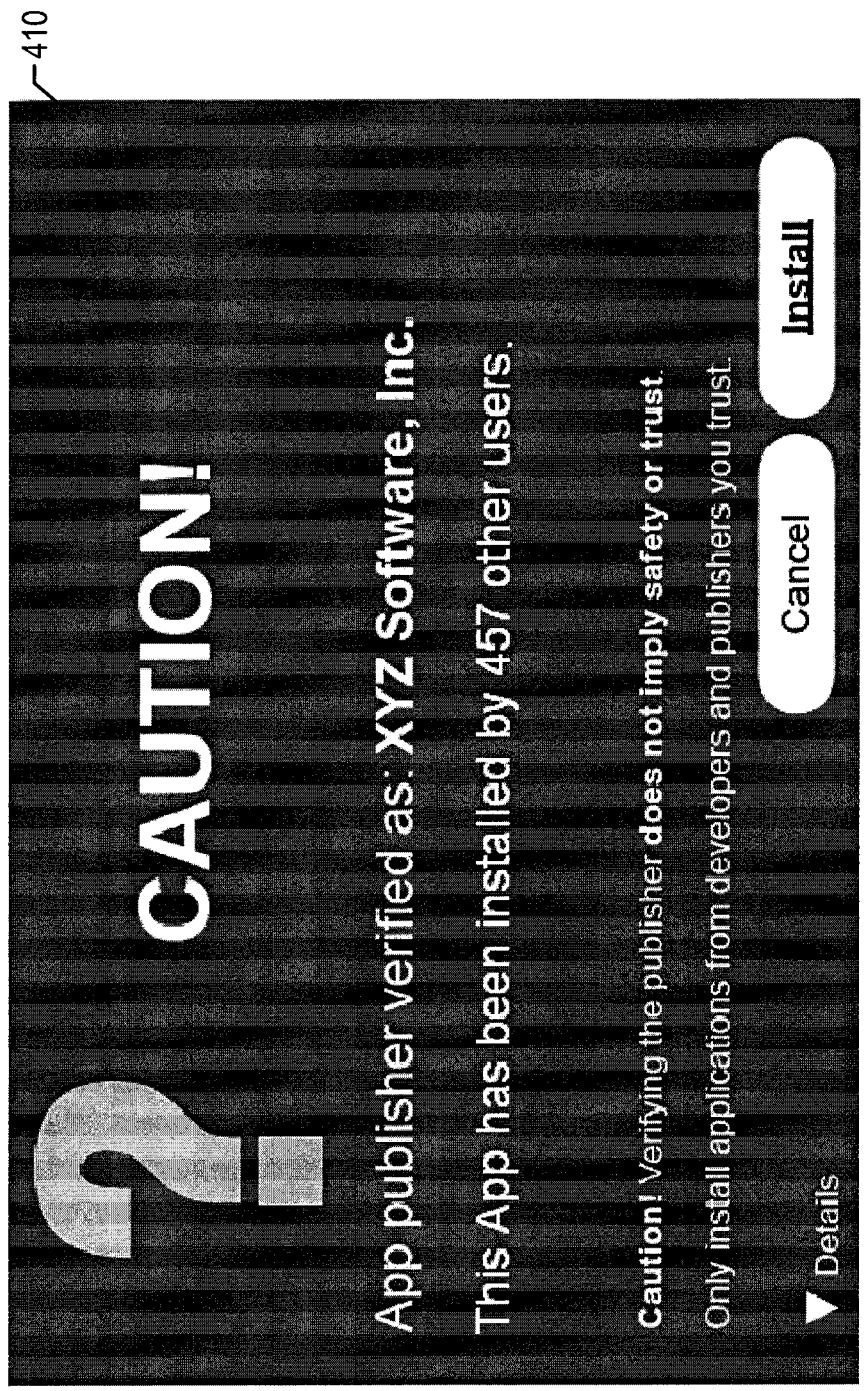
FIGS. 4A-4D show example user interface screens that can be used in a process of using reputation and/or trust information to determine the potential trustworthiness for software to be installed or run in a computing system.

As described above, if a generated identifier matches an identifier in the reputation and trust service or cache, a user of the computing system is provided with the installation information and/or rating information. This information may or may not be provided along with a user-selectable indication for approval, e.g., an install, update, of launch button. For instance, FIG. 4A shows an example installation user interface (410) including an alert displaying installation information. Specifically, the alert in the interface (410) indicates that the application has been installed 457 times. This information is retrieved, for instance, from the reputation and trust service (160) (or alternatively, from a cache 125 in the computer (120)). The interface (410) also includes user selectable 'install' and 'cancel' buttons permitting the user to install the application or cancel installation based on the information now known to the user. In the illustrative example shown in FIG. 4A, a user may be comforted by knowing that the application has already been installed by hundreds of other users, as compared, for instance, to none.

Figure 4B:
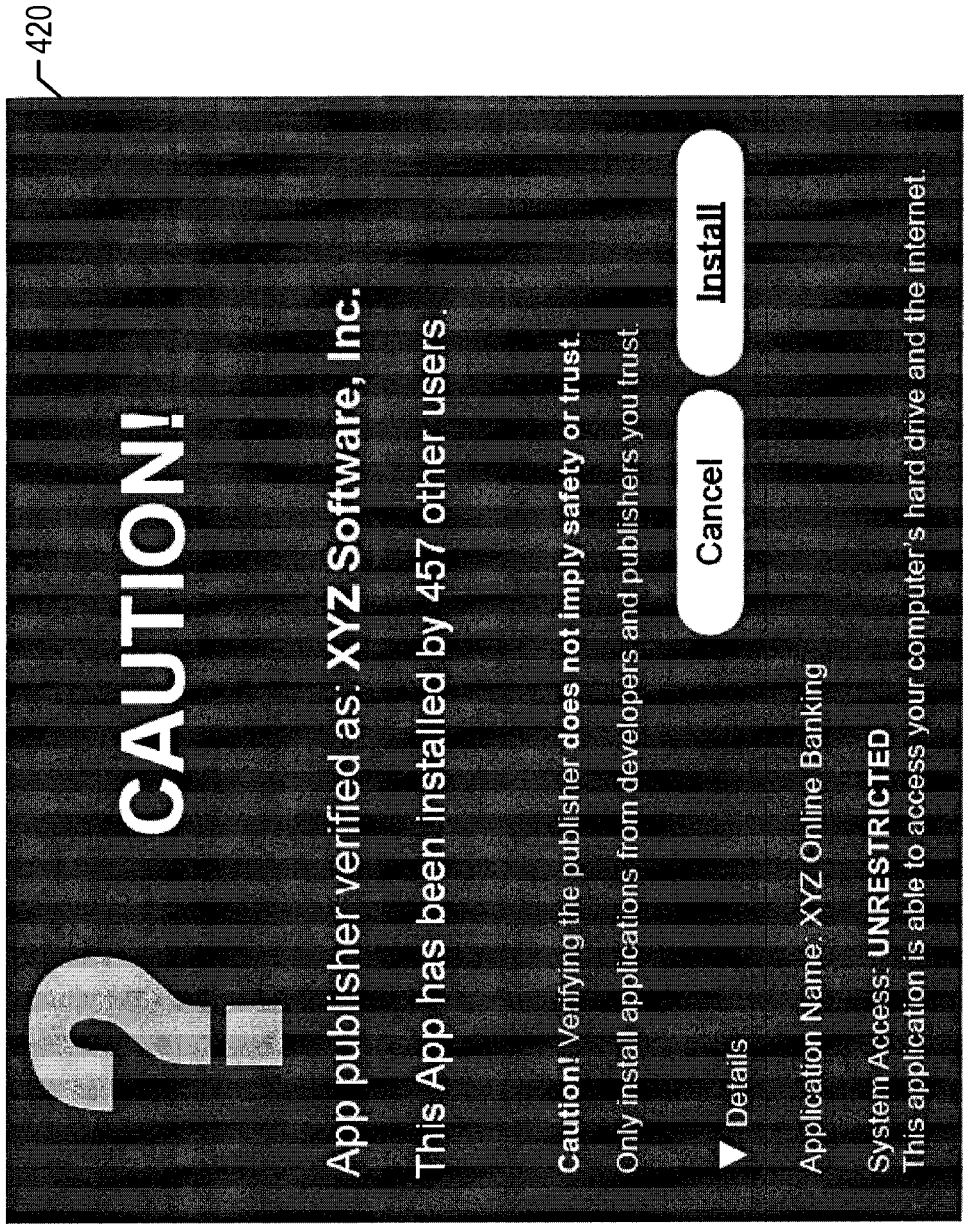

FIG. 4B shows an expanded interface (420) of the interface (410) of FIG. 4A that may be displayed, for instance, when the user selects a 'details' button on the interface (410). The interface (420) can present the user with additional information, such as the application name and a message briefly describing the system access of the application. This detailed information seeks to provide the user with additional information on the software application so that the user can make an informed decision on whether to proceed with installing, launching, or updating the application.

Figure 4C:
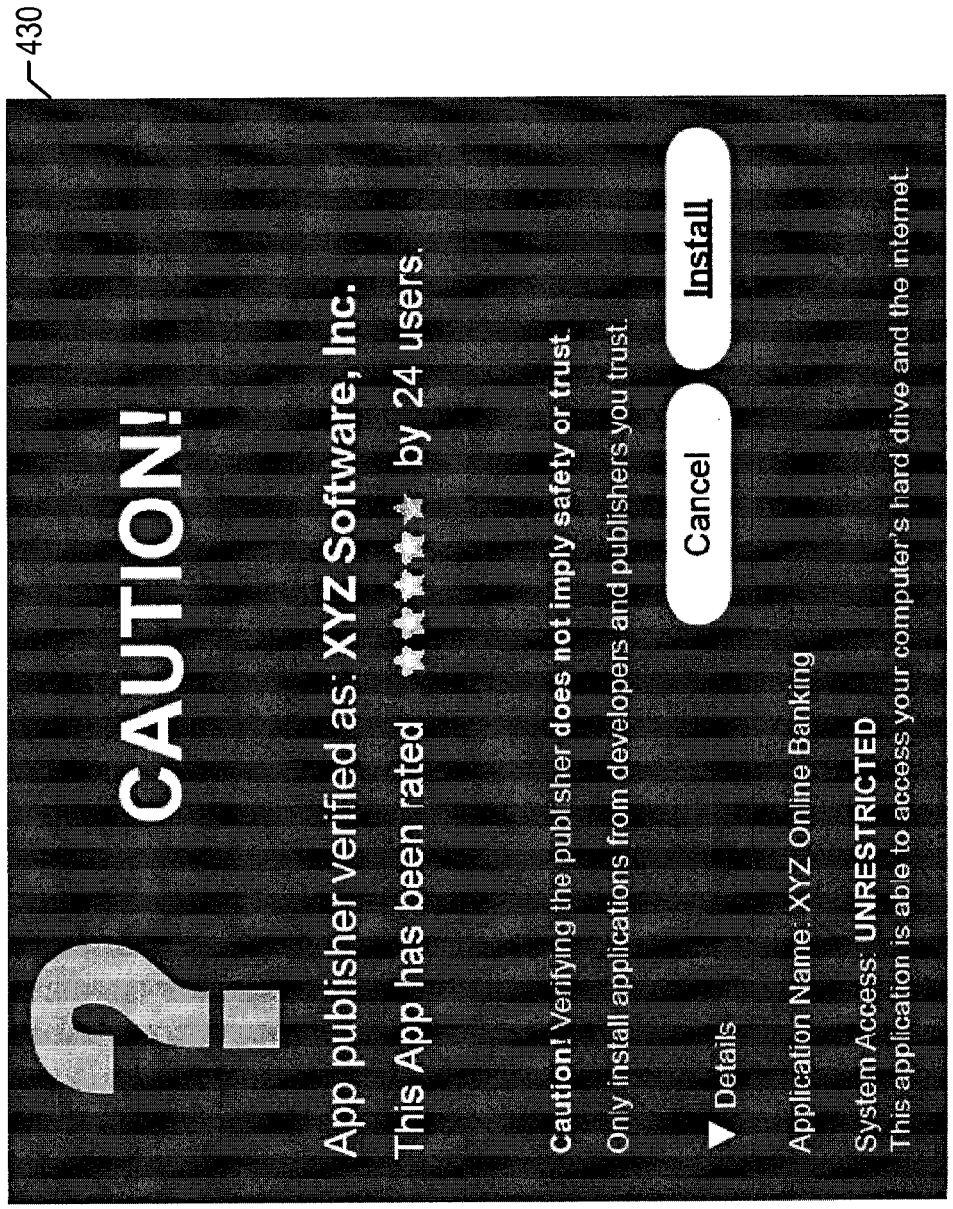

FIG. 4C shows an example installation user interface (430) including an alert displaying rating information. Specifically, the alert in the interface (430) indicates that the application has been given a 4 star (out of possible 5 star) rating. This information is retrieved, for instance, from the reputation and trust service (160) (or alternatively, from a cache 125 in the computer (120)). Optionally and as shown, the alert can also indicate the number of users that provided the rating. The interface (430) also includes user selectable 'install' and 'cancel' buttons permitting the user to install the application or cancel installation based on the information now known to the user. In the illustrative example shown in FIG. 4A, a user may be comforted by knowing that the application is highly rated by 24 users.

The interfaces described above may be combined. For instance, a user may be presented with both installation information and rating information on the same interface. Still other information can be provided to the user, including trust information such as whether the application or publisher is unknown, the type of certificate associated with the application, the application version, if any users have reported the application as malicious, and the like.

§6.0. Rules for Presenting Notifications to Users

According to some implementations, the installation information and/or rating information presented to a user in the GUIs can vary based on the identity of the software, the identity of the developer of the software, whether the software is signed, etc.

Figure 4D:

For instance, if an application is believed to be malicious by the system (e.g., by the reputation and trust system), the installation and rating information may not be displayed to the user because the information may be deemed moot. FIG. 4D shows, for instance, an example warning user interfaces (440) in which an option to continue installing or launching the software application is obfuscated within the user interface, e.g., by first presenting the user interfaces 420 and 430 with the details tab closed, and only presenting the "Install Anyway" and "Start Anyway" options when the details tab is opened. The warning user interface identifies the software as malicious and can clearly indicate that the software should not be installed or run, or should be done so "at your own risk."

The identification of the software as malicious can include software-specific information (e.g., the nature of the malicious behavior), which can be retrieved from the optional information field in the local cache, or from a network resource. The user interface can be constructed using one or more dialogues that include placeholders for information to be provided on the fly. Furthermore, the use of obfuscation in presenting the option to continue in the user interface allows the user to proceed with running the software, but provides a measure of security in that the user is more likely to read the warning before selecting the option to continue.

According to some implementations, if an application is known to be trusted, the installation and rating information may not necessarily be displayed to the user because the information may be deemed moot. This could occur, for instance, if the application has been provided a certification by a third party provider that attests to the identify of the application developer and/or to the trustworthiness of the application.

According to some implementations, the size of location of an alert may be modified based on the content of the status information. For instance, an alert may be increased in size when a low number of users, such as 5 or less, have installed an application. If a very large number of users have installed the application the alert may not be presented at all. Such rules may also be applied to alerts based on rating information.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving, at a computer and from a service, status information corresponding to a software application, the status information comprising rating information and installation information, the installation information corresponding to a number of prior installations, a number of attempted installations, a number of re-installations, and a number of updates of the software application;
updating a local cache, retained by the computer, with the status information received from the service;
generating a software identifier for the software application, wherein generating the software identifier for the software application includes generating a component identifier corresponding to a software component of the software application;
using the software identifier for the software application to identify the status information from the local cache; and
in response to the status information being identified, presenting a notification based on the rating information and the installation information.

2. The method of claim 1, wherein presenting a notification comprises:
presenting a warning user interface indicating the number of prior installations, the number of attempted installations, the number of re-installations, and the number of updates of the software application.

3. The method of claim 1, wherein the rating information comprises a rating provided by an administrator of the service or an average rating of the software application based on a plurality of user ratings.

4. The method of claim 1, wherein using is in response to a request to install the software application or the software component.

5. The method of claim 4, wherein the notification includes user selectable options that permit the user to select whether to proceed with or cancel the installation of the software application or the software component.

6. The method of claim 1, wherein receiving the status information, updating the local cache, generating the software identifier, using the software identifier, and presenting a notification are each performed by a cross-platform runtime environment in which the software application runs.

7. The method of claim 1, wherein using the software identifier comprises using the software identifier for the software application to identify the status information in the local cache retained by the computer and to identify new status information corresponding to the software application obtained from the service.

8. The method of claim 1, wherein using is in response to a request for an update of the software application that includes the software component.

9. The method of claim 8, wherein the notification includes user selectable options that permit the user to select whether to proceed with or cancel the update of the software application.

10. A computer program product, encoded on a computer-readable medium, operable to cause a computer to perform operations comprising:
receiving, at the computer and from a service, status information corresponding to a software application, the status information comprising rating information and installation information, the installation information corresponding to a number of prior installations, a number of attempted installations, a number of re-installations, and a number of updates of the software application;
updating a local cache, retained by the computer, with the status information received from the service;
generating a software identifier for the software application, wherein generating the software identifier for the software application comprises generating a component identifier corresponding to a software component of the software application;
using the software identifier for the software application to identify the status information from the local cache; and
in response to the status information being identified, presenting a notification based on the rating information or the installation information.

11. The computer program product of claim 10, wherein presenting a notification comprises:
presenting a warning user interface to the user indicating the number of prior installations, a number of attempted installations, a number of re-installations, and the number of updates of the software application.

12. The computer program product of claim 10, wherein the rating information comprises a rating provided by an administrator of the service or an average rating of the software application based on a plurality of user ratings.

13. The computer program product of claim 10, wherein using is in response to a request to install the software application or the software component.

14. The computer program product of claim 13, wherein the notification includes user selectable options that permit the user to select whether to proceed with or cancel the installation of the software application or the software component.

15. The computer program product of claim 10, wherein receiving the status information, updating the local cache, generating the software identifier, using the software identifier, and presenting a notification are each performed by a cross-platform runtime environment in which the software application runs.

16. The computer program product of claim 10, further comprising using the software identifier for the software application to identify new status information for the software application obtained from the service.

17. The computer program product of claim 10, wherein using is in response to a request for an update of the software application that includes the software component.

18. The computer program product of claim 17, wherein the notification includes user selectable options that permit the user to select whether to proceed with or cancel the update of the software application.

19. A system comprising:
a service; and
a computer operable to interact with a user interface device and operable to perform operations comprising:
receiving, at the computer and from the service, status information corresponding to a software application, the status information comprising rating information and installation information, the installation information corresponding to a number of prior installations, a number of attempted installations, a number of re-installations, and a number of updates of the software application;
updating a local cache, retained by the computer, with the status information received from the service;
generating a software identifier for the software application, wherein generating the software identifier for the software application comprises generating a component identifier corresponding to a software component of the software application;
using the software identifier for the software application to identify the status information from the local cache; and
in response to the status information being identified, presenting a notification based on the rating information or the installation information.

20. The system of claim 19, wherein the computer comprises a portion of a computing device including the user interface device.

21. The system of claim 19, wherein the computer comprises a mobile phone.

22. A computer-implemented method comprising:
receiving a request to install an update for a software application, wherein the update comprises a software component;
in response to the request, generating an identifier for the software component;
using the identifier to identify status information received from a service, the status information comprising installation information and rating information for the software component, the installation information corresponding to a number of prior installations, a number of attempted installations, a number of re-installations, and a number of updates of the software component; and in response to the status information being identified, presenting a notification based on the rating information or the installation information.

23. The method of claim 22, wherein presenting a notification comprises:
presenting a warning user interface indicating the number of prior installations, a number of attempted installations, a number of re-installations, and the number of updates of the software component.

24. The method of claim 22, wherein the rating information comprises a rating provided by an administrator of the service or an average rating of the software component based on a plurality of user ratings.

25. The method of claim 22,
wherein the notification includes user selectable options that permit the user to select whether to proceed with or cancel the installation of the update of the software application.

26. A computer-implemented method comprising:
storing, at a server, status information comprising rating information and installation information for one or more software applications and one or more software components, the installation information corresponding to a number of prior installations, a number of attempted installations, a number of re-installations, and a number of updates of the one or more software applications and the one or more software components;
receiving, at the server, a request from a client, where the request:
identifies a first component, of the one or more components; and
is initiated at the client in response to an attempt to update a first application with the first component; and
sending the client status information corresponding to the first component wherein the status information is to cause the client to present a notification based on the rating information or the installation information corresponding to the first component.

27. The method of claim 26, further comprising:
collecting rating information and installation information.

28. The method of claim 26, further comprising:
updating the status information.

29. The method of claim 26, further comprising:
receiving, from the client, information identifying that the first application has been installed, not installed, re-installed, or updated at the client; and
updating status information corresponding to the first application in response to the receiving.

30. The method of claim 26, wherein the rating information comprises a rating provided by an administrator associated with the server.

* * * * *